United States Patent
Rose, Jr. et al.

(10) Patent No.: US 9,488,156 B2
(45) Date of Patent: Nov. 8, 2016

(54) BLADE SLING APPARATUS AND METHOD

(71) Applicant: General Electric Company, Schenectady, NY (US)

(72) Inventors: Raymond Francis Rose, Jr., Niskayuna, NY (US); Michael Royce Johnson, Campton, NH (US); Neils Christian Schmitt, Clifton Park, NY (US); Brent Hamilton Holloway, Greenville, SC (US)

(73) Assignee: General Electric Company, Schenectady, NY (US)

( * ) Notice: Subject to any disclaimer, the term of this patent is extended or adjusted under 35 U.S.C. 154(b) by 539 days.

(21) Appl. No.: 14/057,028

(22) Filed: Oct. 18, 2013

(65) Prior Publication Data

US 2015/0110638 A1    Apr. 23, 2015

(51) Int. Cl.
*F03D 1/00* (2006.01)

(52) U.S. Cl.
CPC ........... *F03D 1/003* (2013.01); *F05B 2230/61* (2013.01); *F05B 2230/70* (2013.01); *F05B 2240/916* (2013.01); *Y02E 10/728* (2013.01); *Y02P 70/523* (2015.11); *Y10T 29/4932* (2015.01)

(58) Field of Classification Search
CPC ..... B65D 25/2873; B66C 1/108; B66C 1/18; B66C 1/105; B66C 1/14; F05B 2230/61; F05B 2240/916; F05B 2230/70; F03D 1/001; F03D 13/20; F03D 80/00

USPC ........................................................ 602/4, 23
See application file for complete search history.

(56) References Cited

U.S. PATENT DOCUMENTS

| 4,730,488 A | * | 3/1988 | David | G01P 13/02 |
| | | | | 73/170.07 |
| D387,687 S | * | 12/1997 | Larson | D10/59 |
| 8,083,212 B2 | | 12/2011 | Numajiri et al. | |
| 2010/0139062 A1 | * | 6/2010 | Reed | F03D 1/001 |
| | | | | 29/23.51 |
| 2012/0027561 A1 | | 2/2012 | Riddel et al. | |

FOREIGN PATENT DOCUMENTS

| DK | WO 2011067304 A1 * | 6/2011 | F03D 1/001 |
| WO | 2011064659 A2 | 6/2011 | |
| WO | 2011095167 A2 | 8/2011 | |
| WO | 2013091655 A1 | 6/2013 | |

* cited by examiner

*Primary Examiner* — Danielle M Christensen
(74) *Attorney, Agent, or Firm* — James W. Pemrick; Ernest G. Cusick; Frank A. Landgraff (57) ABSTRACT

An apparatus is provided having a sling or sock configured for contacting a wind turbine blade. A reinforcement member attached to the sling or sock. The reinforcement member configured to resist sling or sock collapse and maintain the sling or sock in an open configuration. A method is also provided for moving a wind turbine part, such as a rotor or blade. The method includes the step of attaching a sling or sock to the wind turbine part, where the sling includes a reinforcement member attached thereto.

13 Claims, 8 Drawing Sheets

BLADE SLING APPARATUS AND METHOD

BACKGROUND OF THE INVENTION

The method and apparatus described herein relates generally to wind turbine blades. More specifically, the method and apparatus relates to a self-supporting wind turbine blade sling.

The process to replace or remove a blade from a wind turbine typically requires an expensive crane and a number of personnel. The crane is used to support the blade, and this same crane at a different time may be used to carry a basket for a worker (often termed a manbasket). The worker climbs into the basket and is then raised up to the tip of the blade. A sling (or sock) is physically placed over the blade tip and then slid along the blade. As one may imagine, this is a difficult process in windy conditions. Cranes are very expensive to rent and operate, and the basket can only be used in periods of low wind, due to worker safety concerns. These limitations make blade removal difficult and expensive.

BRIEF DESCRIPTION OF THE INVENTION

In an aspect of the present invention, an apparatus includes a sling configured for contacting a wind turbine blade. A reinforcement member is attached to the sling. The reinforcement member is configured to resist sling collapse and maintain the sling in an open configuration.

In another aspect of the present invention, an apparatus includes a sock configured for contacting a wind turbine blade. A reinforcement member is attached to the sock. The reinforcement member is configured to resist sock collapse and maintain the sock in an open configuration.

In yet another aspect of the present invention, a method for moving a wind turbine part includes the step of attaching a sling or sock to a rotor blade. The sling or sock includes a reinforcement member attached thereto. The reinforcement member is configured to resist sling or sock collapse and maintain the sling or sock in an open configuration. The method may also include the steps of, positioning the sling or sock on the rotor blade and near a tip of the rotor blade, or attaching one or more tag lines to the sling or sock. The one or more tag lines are configured for controlling the moving of the wind turbine part.

DETAILED DESCRIPTION OF THE INVENTION

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features.

Figure 1:
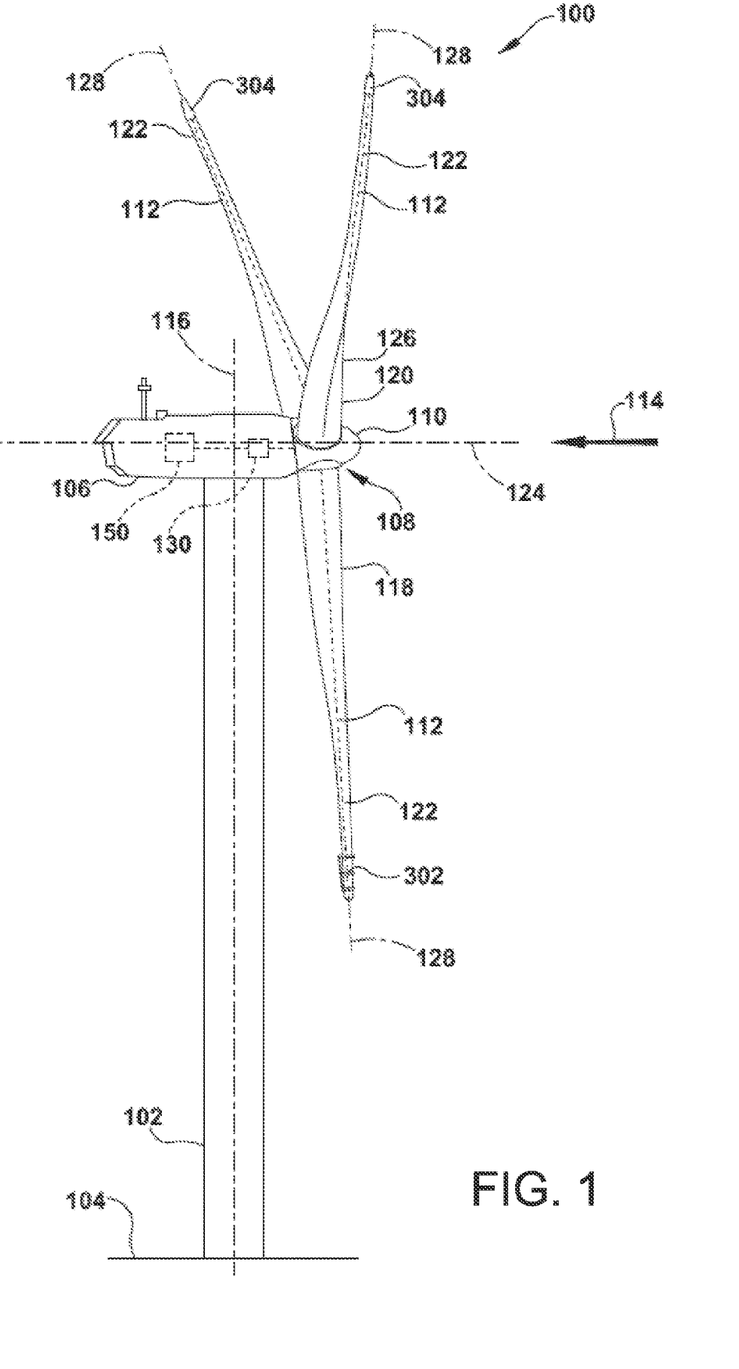
FIG. 1 illustrates a perspective view of an exemplary wind turbine.

FIG. 1 is a schematic view of an exemplary wind turbine 100. In the exemplary embodiment, wind turbine 100 is a horizontal-axis wind turbine. Wind turbine 100 includes a tower 102 extending from and coupled to a supporting surface 104. Tower 102 may be coupled to surface 104 with anchor bolts or via a foundation mounting piece (neither shown), for example. A nacelle 106 is coupled to tower 102, and a main shaft assembly 108 is coupled to nacelle 106. Main shaft assembly (or rotor) 108 includes a rotatable hub 110 and a plurality of rotor blades 112 coupled to hub 110. Main shaft assembly 108 includes three rotor blades 112. Alternatively, main shaft assembly 108 may have any suitable number of rotor blades 112 that enables wind turbine 100 to function as described herein. Tower 102 may have any suitable height and/or construction that enables wind turbine 100 to function as described herein.

Rotor blades 112 are spaced about hub 110 to facilitate rotating main shaft assembly 108, thereby transferring kinetic energy from wind 114 into usable mechanical energy, and subsequently, electrical energy. Main shaft assembly 108 and nacelle 106 are rotated about tower 102 on a yaw axis 116 to control a perspective of rotor blades 112 with respect to a direction of wind 114. Rotor blades 112 are mated to hub 110 by coupling a rotor blade root portion 118 to hub 110 at a plurality of load transfer regions 120. Load transfer regions 120 each have a hub load transfer region and a rotor blade load transfer region (both not shown in FIG. 1). Loads induced to rotor blades 112 are transferred to hub 110 via load transfer regions 120. Each rotor blade 112 also includes a rotor blade tip portion 122.

Rotor blades 112 may have a length of between approximately 30 meters (m) (99 feet (ft)) and approximately 120 m (394 ft). Alternatively, rotor blades 112 may have any suitable length that enables wind turbine 100 to function as described herein. For example, rotor blades 112 may have a suitable length less than 30 m or greater than 120 m. As wind 114 contacts rotor blade 112, lift forces are induced to rotor blade 112 and rotation of rotor 108 about an axis of rotation 124 is induced as rotor blade tip portion 122 is accelerated.

A pitch angle (not shown) of rotor blades 112, i.e., an angle that determines the perspective of rotor blade 112 with respect to the direction of wind 114, may be changed by a pitch assembly (not shown in FIG. 1). More specifically, increasing a pitch angle of rotor blade 112 decreases an amount of rotor blade surface area 126 exposed to wind 114 and, conversely, decreasing a pitch angle of rotor blade 112 increases an amount of rotor blade surface area 126 exposed to wind 114. The pitch angles of rotor blades 112 are adjusted about a pitch axis 128 at each rotor blade 112, and the pitch angles of rotor blades 112 may be controlled individually. Further, wind turbine 100 includes a main gearbox 130 and a generator 150 within nacelle 106. Main shaft assembly 108 includes a low-speed shaft (not shown in FIG. 1) that extends into main gearbox 130 and a high-speed shaft (not shown in FIG. 1) extends to generator 150.

Figure 2:
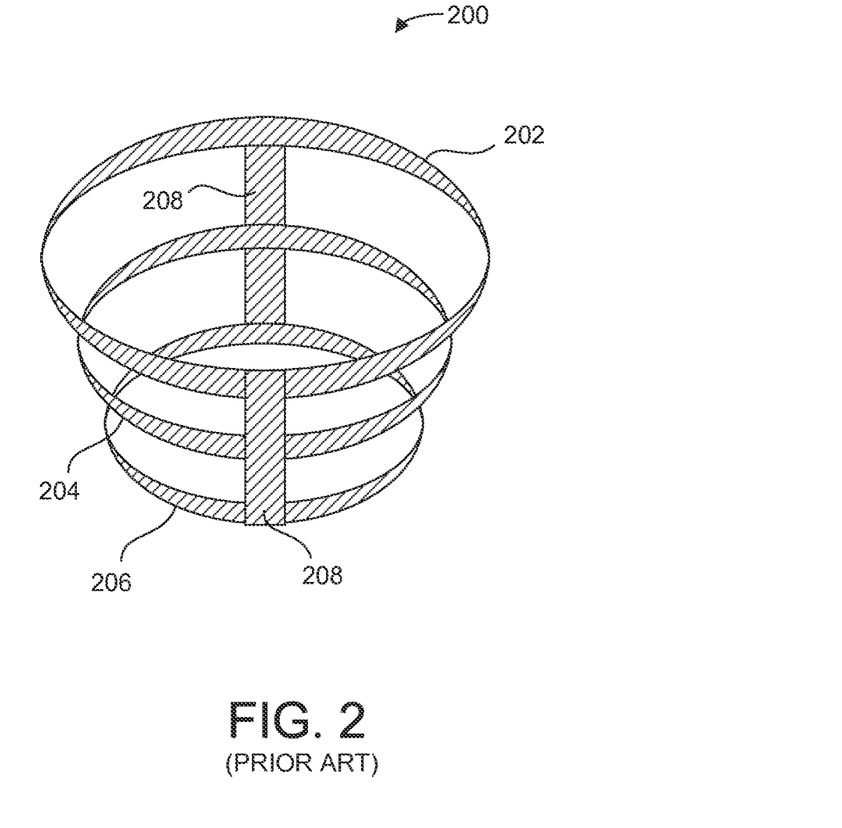
FIG. 2 illustrates a perspective view of one known blade sling.

FIG. 2 illustrates a perspective view of one known blade sling (or sock) 200. The sling 200 is typically fabricated from multiple fabric (e.g., nylon or canvas) straps sewn together. The sling 200 is dimensioned to roughly follow the profile of a blade 112, and as may be seen the upper strap 202 is larger in length than the middle strap 204 or lower strap 206. The upper, middle and lower straps are joined together with multiple vertical straps 208. A crane (not shown) is attached to the sling 200 via a rope (not shown) and a worker places this sling over the blade tip 122 and maneuvers the sling 200 up along the blade until it fits snugly. In this manner the sling 200 can be placed over the blade 112. However, one crane is needed to support the blade 112 and sling 200, while a second crane is needed for the worker to maneuver the sling into position. In addition, the fabric collapses easily and this problem is exacerbated in light to moderate winds.

Figure 3:
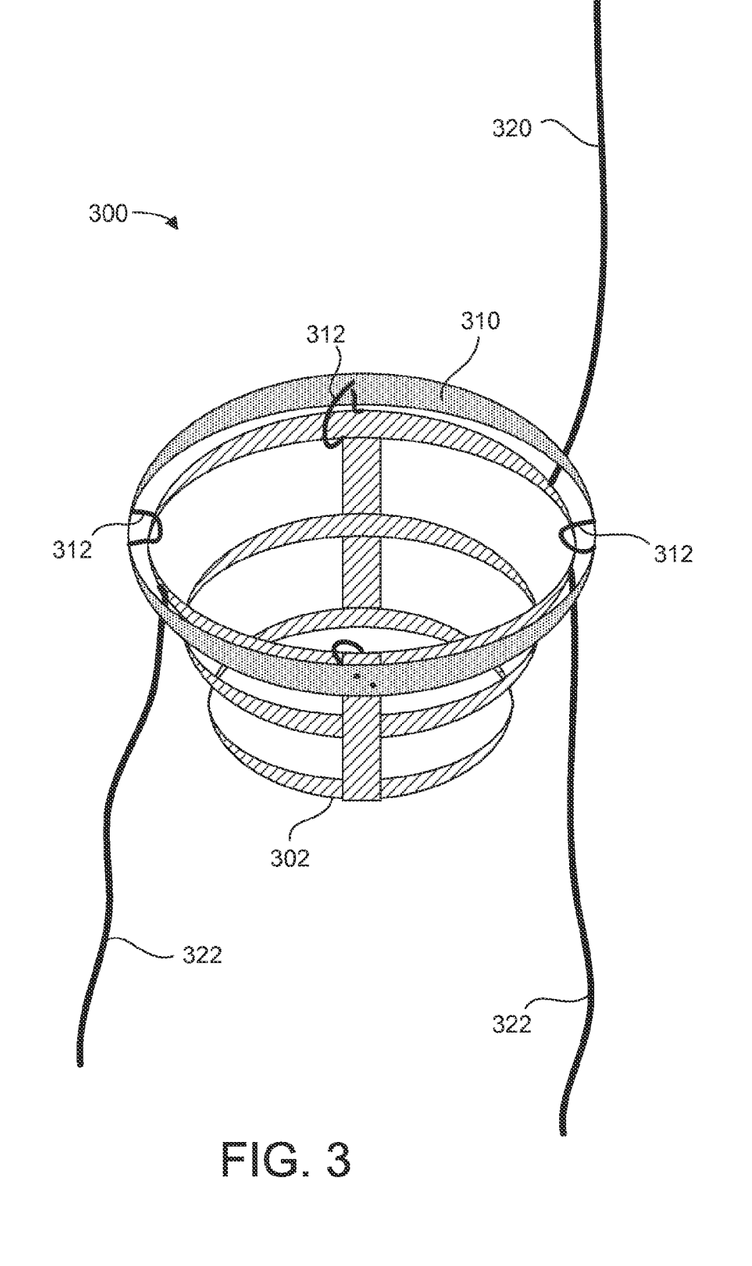
FIG. 3 illustrates a perspective view of a blade sling, according to an aspect of the present invention.

FIG. 3 illustrates a perspective view of a blade sling (or apparatus) 300, according to an aspect of the present invention. The blade sling 300 includes a sling 302 configured for supporting or contacting a wind turbine blade 112. The sling 302 may be formed of a plurality of straps (as shown), or the sling may be formed by a sock 304 (e.g., like a bag or windsock) having an opening at one end or openings at both ends. The sock 304 fits over the blade, and the fabric for either the sling 302 or sock 304 may be nylon, canvas, fiberglass, polyvinyl chloride (PVC), or any other suitable material. In these applications, the terms sling and sock are viewed as substantially the same, as they are both placed over the blade tip and are used to control movement of the rotor 108 or blade 122. A reinforcement member 310 is attached to the sling 302. The reinforcement member 310 may be comprised of a ring of plastic, metal, fiberglass, polyvinyl chloride (PVC), or any other suitable material, and can be substantially ring shaped (as shown) or may have a substantially teardrop or substantially airfoil shape similar to a portion of a wind turbine blade. The reinforcement member 310 is attached to the sling 302 strap via rope 312 or any other suitable means, such as, twine, ties or tape (e.g., duct tape). The reinforcement member 310 naturally wants to remain open, or in a generally circular form as shown, and in this manner the reinforcement member 310 is configured to resist sling collapse and thereby maintains the sling 302 in an open configuration (as shown). The sling 302 or sock 304 may be generally tapered in shape having a first end with a larger diameter and a second end with a smaller diameter. The reinforcement member may be attached to the first end.

A single piece of rectangular plastic or metal may be used to form the reinforcement member 310, with the ends thereof being joined together. For example, the ends could have holes drilled therein and these holes could be fastened together with zip-ties, mechanical fasteners, nuts and bolts, tape or any other suitable fastener. Adhesive could also be used to bond overlapping ends of the reinforcement member 310. The reinforcement member 310 may have any suitable dimensions as required in the specific application. As a non-limiting example only, the reinforcement member 310 may have a circumference (or length) of about 10 feet to about 20 feet, a width (or height) of about 6 inches to about 1.5 feet, and a thickness of about ⅜ of an inch to about ⅝ of an inch. However, dimensions above or below this range may be used as well. A rope/tag line 320 may be attached to the sling 302 and then extend upward to a crane (not shown) or to a worker. One or more tag lines (e.g., ropes) 322 may also be attached to the sling 302, and these tag lines extend downwardly to enable workers to manipulate and guide the sling 300 as well as the rotor 108. The combination of the sling 302/sock 304 and reinforcement member 310 may be viewed as a system for moving a wind turbine blade or rotor 108.

Figure 4:
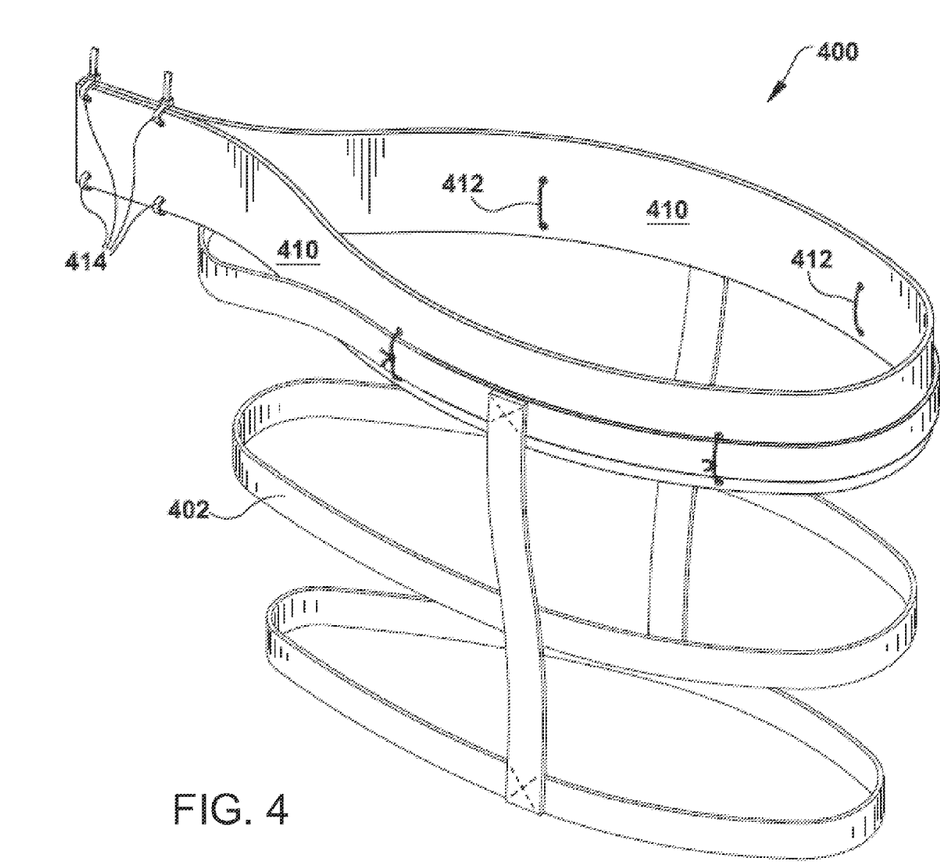
FIG. 4 illustrates a perspective view of a blade sling, according to an aspect of the present invention.

FIG. 4 illustrates a perspective view of a blade sling (or apparatus) 400, according to an aspect of the present invention. The reinforcement member 410 may be attached to the inside (or outside) of the sling 402 near the top thereof. The reinforcement member 410 is attached to sling 402 by twine 412. The twine 412 is looped though a series of holes and then tied off. The reinforcement member 410 is formed into an airfoil shape or teardrop shape by fastening the ends of the reinforcement member together. In this example, zip ties 414 are passed through respective holes to form the airfoil shape.

Figure 5:
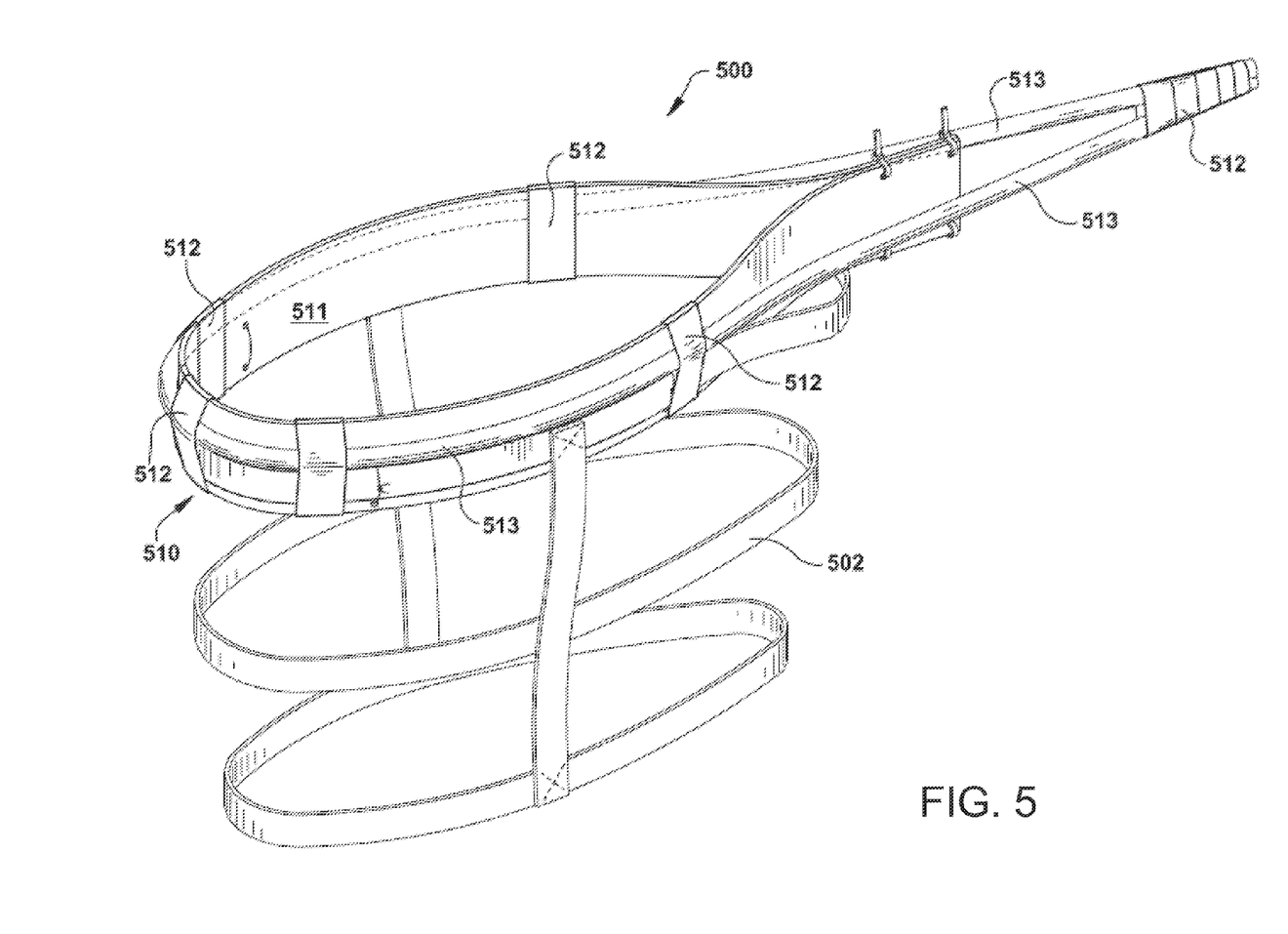
FIG. 5 illustrates a top view of a sling having a multiple piece reinforcement member, according to an aspect of the present invention.

FIG. 5 illustrates a top view of a sling 500 having a multiple piece reinforcement member 510. The reinforcement member 510 may incorporate additional reinforcement when desired. For example the inner reinforcement member 511 is similar in configuration to reinforcement member 410, However, an outer reinforcement member 513 is attached to the inner reinforcement member 511 and/or sling 502. The inner reinforcement member 511 is a generally planar element bent into a generally circular, generally airfoil or teardrop shape. Outer reinforcement member 513 may be a pipe or conduit bent into a generally circular, generally airfoil or teardrop shape, and is attached to the inner reinforcement member 511 by tape 512 (e.g., duct tape). The ends of the outer reinforcement member 513 are also bound together with the use of tape 512. However, any suitable fastening system could be used instead of tape 512, such as clamps, lashing, roe, twine or adhesive. The outer reinforcement member 513 combined with the inner reinforcement member 511 provide a greater resistance to collapsing than the inner reinforcement member alone, and this configuration may be desirable in some applications or when using thinner material for the inner reinforcement member 511.

Figure 6:
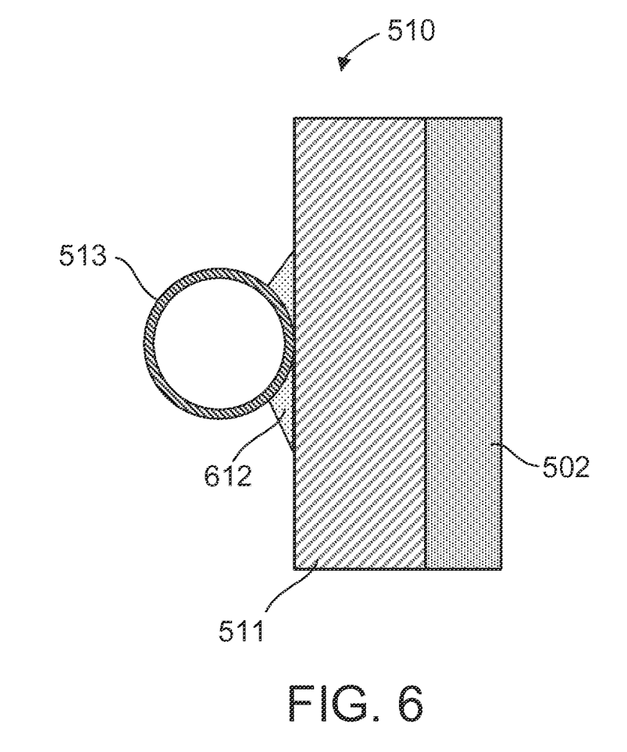
FIG. 6 illustrates a cross-sectional view of the sling and reinforcement member, according to an aspect of the present invention.

FIG. 6 illustrates a cross-sectional view of the sling 500 and reinforcement member 510, according to an aspect of the present invention. The sling 502 may be placed either adjacent to (i.e., inside) inner reinforcement member 511 (as shown) or between inner reinforcement member 510 and outer reinforcement member 513 (as shown in FIG. 5). The outer reinforcement member 513 adds rigidity to the inner reinforcement member 511. The outer reinforcement member 513 may be joined or attached to the inner reinforcement member 511 by adhesive 612, tape 512, or any other suitable fastening arrangement.

Figure 7:
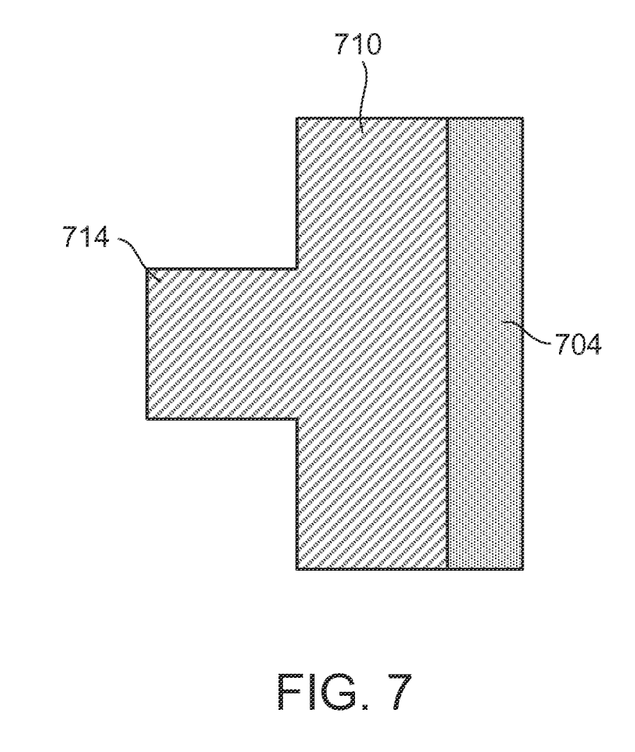
FIG. 7 illustrates a cross-sectional view of a portion of a sock and a reinforcement member, according to an aspect of the present invention.

FIG. 7 illustrates a cross-sectional view of a portion of a sock and a reinforcement member 710, according to an aspect of the present invention. The sock 704 can be attached to the reinforcement member 710 by any of the aforementioned methods (e.g., tape, adhesive, twine, etc.). The reinforcement member 710 includes one or more ridges 714 either integrally formed therewith or attached thereto, and this ridge 714 adds rigidity to the reinforcement member 710. The ridge 714 adds greater resistance to collapsing during sock/sling manipulation. Multiple rodges may be used, and the ridges may have and desired shape (e.g., rectangular, curvilinear, etc.). The ridges may also form a corrugated pattern.

Figure 8:
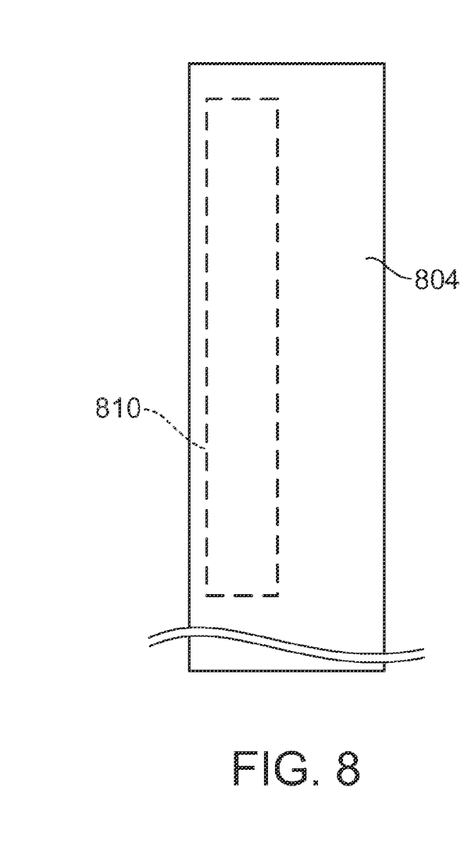
FIG. 8 illustrates a cross-sectional view of the sock where the reinforcement member is sewn into the sock, according to an aspect of the present invention.

FIG. 8 illustrates a cross-sectional view of a sock 804 having the reinforcement member 810 sewn therein, according to an aspect of the present invention. The reinforcement member 810 could be placed inside layers of sock 804 fabric, or with a sling within the top strap or outside the top strap. However, the reinforcement member 810 could also be sewn into the sock 804 (as shown) or within a top strap of a sling. For a sling, the reinforcement member 810 could be sewn into multiple straps (e.g., the top, middle and/or bottom straps). The reinforcement member 810 could also be formed of wire, conduit, sheet material, or any material that adds rigidity and resists collapsing.

The sling or sock may be configured for use with wind turbine blades having winglets. A winglet is a load carrying device that reduces the spanwise flow, diffuses and moves the tip vortex away from the rotor plane reducing the downwash and thereby the induced drag on the blade. Adding a winglet to a wind turbine rotor may increase produced power by about 1.0% to about 3.0%. Typically, the shape of a winglet may include some or all of winglet height, sweep angle, cant angle, curvature radius, toe angle and twist angle. The sling or sock can be fabricated to slide over these winglets by accommodating their shape. Alternatively, the sling or sock can have two open ends, so that sling or sock slides past the winglet and rests on only a portion of the winglet or on none of the winglet. Many wind turbine blades have a twist and the sling or sock may also be configured with a twist to accommodate this shape. Specifically, the reinforcement member(s) may also be configured with a twist to substantially match the blade's twist.

Figure 9:
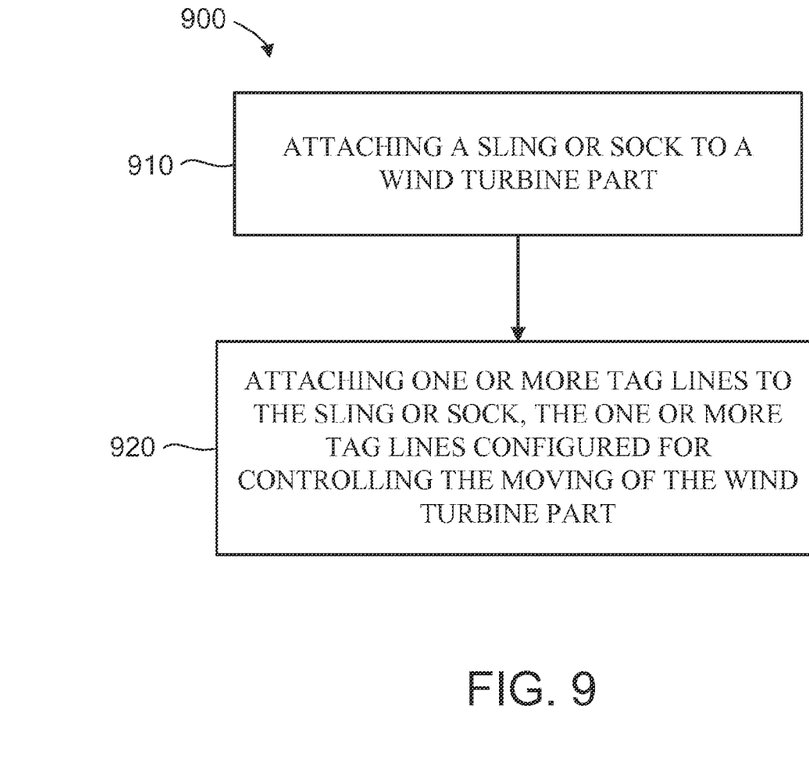
FIG. 9 illustrates a flowchart of a method for moving a wind turbine part, according to an aspect of the present invention.

FIG. 9 illustrates a flowchart of a method 900 for moving a wind turbine part, according to an aspect of the present invention. The method 900 includes the step 910 of attaching a sling 302 or sock 802 to the wind turbine part (e.g., a rotor 108 or a blade 112). The sling 302 or sock 802 includes a reinforcement member 310 attached thereto. The reinforcement member 310 is configured to resist sling 302 or sock 802 collapse and maintain the sling 302 or sock 802 in an open configuration. The method 900 may also include the step 920 of attaching one or more tag lines 320, 322 to the sling 302 or sock 802. The tag lines 320, 322 are configured for controlling the moving of the wind turbine part. For example, as the rotor 108 (or blade 112) is lowered by a crane, the tag lines 320, 322 can be used by workers to control the movements of the rotor 108 or blade 112.

Figure 10:
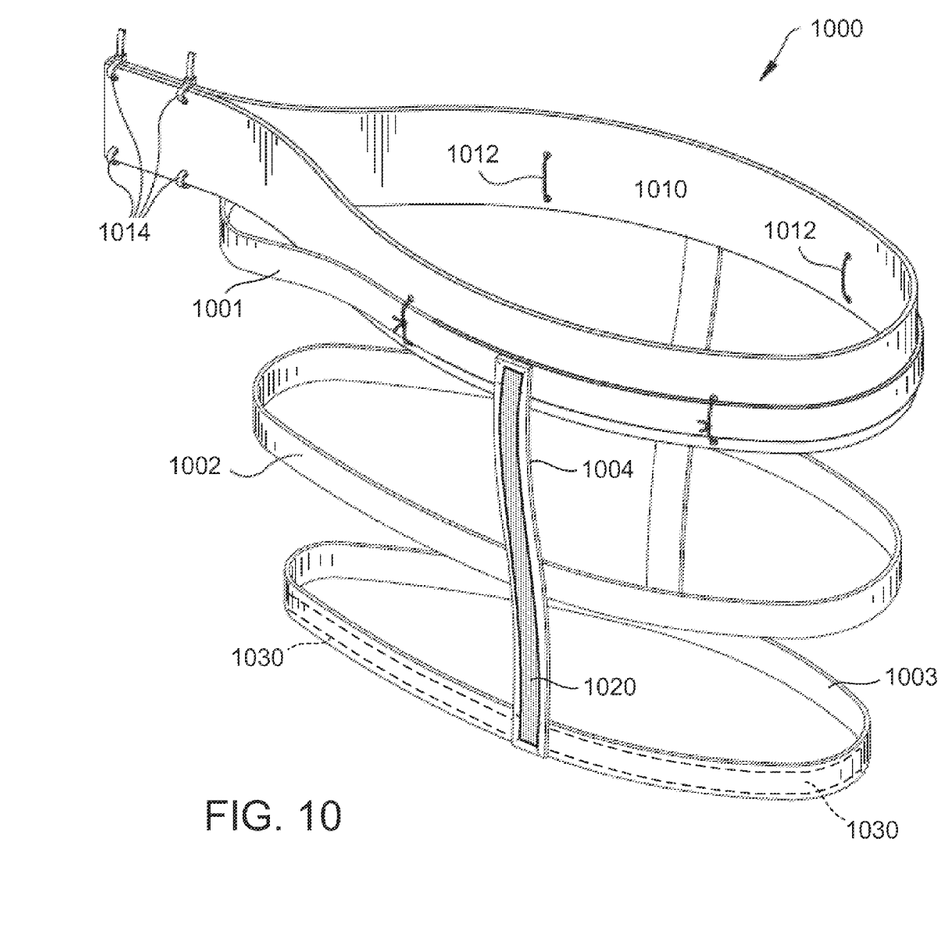
FIG. 10 illustrates a perspective view of a blade sling, according to an aspect of the present invention.

FIG. 10 illustrates a perspective view of a blade sling (or apparatus) 1000, according to an aspect of the present invention. A first reinforcement member 1010 may be attached to the inside (or outside) of the sling 1000 near the top thereof (e.g., to top strap 1001). The reinforcement member 1010 is attached to sling 1000 by twine 1012. The twine 1012 is looped though a series of holes and then tied off. A second reinforcement member 1020 is attached to a vertical strap 1004, and this configuration provides longitudinal stiffness. Only one vertical reinforcement member 1020 is shown, but it is to be understood that multiple vertical reinforcement members 1020 could be attached to some or all of the vertical straps 1004. A third reinforcement member 1030 is sewn into the bottom strap 1003 and extends throughout substantially the entire bottom strap 1003. The horizontal reinforcement members 1010, 1030 may be formed into an airfoil shape or teardrop shape, while the vertical reinforcement member may be shaped to accommodate blade twist or other blade properties. Zip ties 1014 are used to bind the ends of reinforcement member 1010. The reinforcement members 1010 and 1030 may also be viewed as extending in a substantially chordwise direction, and the reinforcement member 1020 may be viewed as extending in a substantially spanwise direction.

The apparatus and method of the present invention demonstrates substantially improved results that were unexpected, because a sling/sock can now be used in higher wind speeds. Some wind turbines have cranes or pulley systems integrated into the nacelle, and this may enable blade installation and/or removal without the use of any cranes.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An apparatus comprising:
a sling configured for contacting a wind turbine blade; and
a reinforcement member attached to the sling, the reinforcement member configured to resist sling collapse and maintain the sling in an open configuration, the reinforcement member comprising an inner reinforcement member attached to an outer reinforcement member, the inner reinforcement member comprised of a planar element, and the outer reinforcement member is a pipe or conduit, and
wherein both the inner reinforcement member and the outer reinforcement member are bent into a circular, airfoil or teardrop shape.

2. The apparatus of claim 1, the sling further comprising:
a plurality of straps connected together, wherein the plurality of straps are configured to conform to a portion of the wind turbine blade; and
wherein the sling is generally tapered in shape having a first end with a larger diameter and a second end with a smaller diameter, and the reinforcement member is attached to the first end.

3. The apparatus of claim 1, wherein the reinforcement member is sewn into the sling.

4. The apparatus of claim 1, further comprising at least one vertical reinforcement member.

5. The apparatus of claim 4, wherein the reinforcement member extends in a chordwise direction, and the at least one vertical reinforcement member extends in a spanwise direction.

6. The apparatus of claim 1, further comprising one or more tag lines attached to the sling or reinforcement member.

7. An apparatus comprising:
- a sock configured for contacting a wind turbine blade, the sock is configured to conform to a portion of the wind turbine blade; and
- a reinforcement member attached to the sock, the reinforcement member configured to resist sock collapse and maintain the sock in an open configuration, the reinforcement member comprising an inner reinforcement member attached to an outer reinforcement member, the inner reinforcement member comprised of a planar element, and the outer reinforcement member is a pipe or conduit, and
- wherein both the inner reinforcement member and the outer reinforcement member are bent into a circular, airfoil or teardrop shape.

8. The apparatus of claim 7, wherein the reinforcement member is sewn into the sock.

9. The apparatus of claim 7, further comprising at least one vertical reinforcement member.

10. The apparatus of claim 9, wherein the reinforcement member extends in a chordwise direction, and the at least one vertical reinforcement member extends in a spanwise direction.

11. A method for moving a wind turbine part, the method comprising the steps of:
- attaching a sling or sock to a rotor blade;
- wherein the sling or sock includes a reinforcement member attached thereto, the reinforcement member configured to resist sling or sock collapse and maintain the sling or sock in an open configuration, the reinforcement member comprising an inner reinforcement member attached to an outer reinforcement member, the inner reinforcement member comprised of a planar element, and the outer reinforcement member is a pipe or conduit, and both the inner reinforcement member and the outer reinforcement member are bent into a circular, airfoil or teardrop shape.

12. The method of claim 11, further comprising:
attaching one or more tag lines to the sling or sock, the one or more tag lines configured for controlling the moving of the wind turbine part.

13. The method of claim 11, further comprising:
positioning the sling or sock on the rotor blade and near a tip of the rotor blade.

* * * * *

UNITED STATES PATENT AND TRADEMARK OFFICE
CERTIFICATE OF CORRECTION

PATENT NO. : 9,488,156 B2
APPLICATION NO. : 14/057028
DATED : November 8, 2016
INVENTOR(S) : Rose, Jr. et al.

Page 1 of 1

It is certified that error appears in the above-identified patent and that said Letters Patent is hereby corrected as shown below:

In the Specification

In Column 3, Line 58, delete "blade 122." and insert -- blade 112. --, therefor.

In Column 4, Line 37, delete "though" and insert -- through --, therefor.

In Column 4, Line 48, delete "410, However," and insert -- 410. However, --, therefor.

In Column 5, Line 19, delete "rodges" and insert -- ridges --, therefor.

In Column 6, Line 7, delete "though" and insert -- through --, therefor.

Signed and Sealed this
Thirty-first Day of January, 2017

Michelle K. Lee
*Director of the United States Patent and Trademark Office*